J. H. WHITLEY.
Photo-Mechanical Printing.
No. 228,579.          Patented June 8, 1880.

UNITED STATES PATENT OFFICE.

JOHN H. WHITLEY, OF ELMIRA, NEW YORK.

PHOTO-MECHANICAL PRINTING.

SPECIFICATION forming part of Letters Patent No. 228,579, dated June 8, 1880.

Application filed February 5, 1880.

*To all whom it may concern:*

Be it known that I, JOHN H. WHITLEY, of Elmira, Chemung county, State of New York, have invented an Improvement in Photo-Mechanical Printing, of which the following is a specification.

My invention relates to that class of photo-mechanical-printing processes in which the sensitized gelatine is carried by a plate, and prints are taken from the gelatine surface after the same has been acted upon by the light.

While a gelatine film will adhere when dry to the plate to which it is applied, it is apt to peel off in the process of printing, which usually requires the gelatine to be dampened before the application of the ink.

The main object of my invention is to firmly secure the printing-film to the plate.

In carrying out my invention I employ a plate, (represented by $a$ in the accompanying drawing, forming a part of this specification,) said plate being of glass, porcelain, metal, or other suitable material. This plate I coat with albumen, and to secure as thin a film as possible I dilute the albumen with ten times its bulk of water. After the coating has dried I harden the same, forming a hard albumen film, $b$. Various modes of hardening may be resorted to. I prefer, however, to effect the result by dipping the plate in an aqueous solution of chromic acid for from one to three minutes and then washing and drying. Upon this hardened film I apply a film, $c$, of porous collodion. The film may be made porous by various means. That which I have found preferable consists in combining with the collodion solution a small amount of any suitable resin — say two grains to the ounce — and methylated alcohol — say one ounce of ether, one ounce of alcohol, and one ounce of methylated alcohol — with nine grains of gun-cotton. This film $c$, while adhering tenaciously to the albumen film, is open or porous enough to afford a firm hold for the film, $d$, of sensitized gelatine, which is applied and prepared for printing in the usual manner. By this means the printing-film is secured to the plate so that it will adhere without being displaced at any point by the moisture or pressure during subsequent printing operations.

It will be seen that the albumen is rendered both hard and insoluble by the action of chromic acid, so that the collodion solution will not dissolve or affect the same, and that the gelatine solution will have no effect tending to separate the collodion from its under layer.

I claim—

1. The improvement in the preparation of plates for photo-mechanical printing, consisting in applying to a plate, $a$, an albumen coating, hardening and drying the same, then applying a film of porous collodion, and then a film of sensitized gelatine, substantially as set forth.

2. The photo-mechanical-printing plate consisting of the backing-plate $a$, hardened albumen film $b$, porous collodion film $c$, and sensitized gelatine film $d$, substantially as set forth.

In testimony whereof I have signed my name to this specification in the presence of two subscribing witnesses.

JOHN H. WHITLEY.

Witnesses:
CHARLES E. FOSTER,
ALBERT L. LAWRENCE.